United States Patent
Gersbach

(10) Patent No.: US 6,820,309 B1
(45) Date of Patent: Nov. 23, 2004

(54) BELT FASTENERS

(76) Inventor: Johann Gersbach, 66 3rd Street, Linden, 2195, Johannesburg (ZA)

(*) Notice: Subject to any disclaimer, the term of this patent is extended or adjusted under 35 U.S.C. 154(b) by 71 days.

(21) Appl. No.: 09/857,927

(22) PCT Filed: Oct. 13, 2000

(86) PCT No.: PCT/ZA00/00190

§ 371 (c)(1), (2), (4) Date: Jun. 11, 2001

(87) PCT Pub. No.: WO01/27493

PCT Pub. Date: Apr. 19, 2001

(30) Foreign Application Priority Data

Oct. 14, 1999 (ZA) .............................................. 99/6493

(51) Int. Cl.[7] .............................................. F16D 1/00
(52) U.S. Cl. .................... 24/31 B; 24/31 R; 198/844.2; 403/408.1; 403/293; 403/343
(58) Field of Search .............................. 403/408.1, 296, 403/293, 343, 373, 374.1, 374.2, 374.3, 312, 388, 389; 411/107, 969, 181, 399, 180, 183, 512; 24/31 B, 33 B, 31 R; 198/844.2

(56) References Cited

U.S. PATENT DOCUMENTS

| | | | | |
|---|---|---|---|---|
| 1,627,912 A | * | 5/1927 | Lomason | .................... 411/399 |
| 2,129,583 A | * | 9/1938 | Johansson | .................... 228/136 |
| 3,058,211 A | * | 10/1962 | Axtell | ........................ 29/509 |
| 3,381,362 A | * | 5/1968 | Church et al. | ............. 29/432.2 |
| 4,114,670 A | * | 9/1978 | Akashi et al. | ........... 151/41.72 |
| 5,251,370 A | * | 10/1993 | Muller et al. | .................. 29/512 |
| 5,599,131 A | * | 2/1997 | Julen et al. | .................. 403/342 |
| 6,345,925 B1 | * | 2/2002 | Coleman | ..................... 403/24 |

FOREIGN PATENT DOCUMENTS

| | | | |
|---|---|---|---|
| GB | 599930 | 3/1948 | |
| GB | 1522211 | 8/1978 | |
| GB | 1 522 211 | * 8/1978 | ............. F16G/3/08 |

* cited by examiner

Primary Examiner—John R. Cottingham
Assistant Examiner—Michael P. Ferguson
(74) Attorney, Agent, or Firm—Merchant & Gould P.C.

(57) ABSTRACT

A belt fastener (10) includes a pair of operative first and second plates (12 and 14) having apertures (16) which are configured to be arranged in register with each other in an operative connecting condition as shown wherein the plates (12 and 14) span opposing surfaces (18 and 20) of a pair of belt ends (22 and 24) to be connected. The apertures (16) are configured to permit a shank portion (26) of a bolt (28) to pass therethrough such that in the connecting or clamping condition, the shanks (26) pass through the aligned apertures (16) of the first plate (12), belt ends (22 and 24) and second plate (14).

8 Claims, 3 Drawing Sheets

BELT FASTENERS

FIELD OF THE INVENTION

This invention relates to belt fastener for fastening together a pair of belt ends and in particular to plate-type belt fasteners in which the plates span the belt ends.

BACKGROUND OF THE INVENTION

The Applicant is aware of certain prior art and in particular U.S. Pat. No. 5,599,131 and Brazilian Patent Application No. BR6600420 (subsequently abandoned) wherein plate-type belt fasteners for connecting together a pair of belt ends are described.

The belt fasteners described in the prior art include operative first and second plates having apertures which are configured to be arranged in register with each other in an operative connecting condition wherein the plates span opposing surfaces of a pair of belt ends to be connected, each aperture being configured to permit a shank portion of a bolt to pass therethrough such that in the operative connecting condition, the shanks of the bolts pass through the aligned apertures of the first plate, belt ends and second plate, nuts which are screw threadedly received by the shanks projecting through the second plates serving to urge the first and second plates into the operative connecting or damping condition wherein the belt ends are retained or clamped between said plates.

In the prior art, plastic washer or spring clip arrangements were provided on the shanks of the bolts to retain the bolts in position in the first plates thereby inter elia to facilitate interconnection of the belt ends and to inhibit longitudinal or rotational displacement of the bolts relative to the first plate.

SUMMARY OF THE INVENTION

According to an aspect of the invention there is provided a belt fastener for fastening together a pair of belt ends including:—
operative first and second plates having apertures which are configured to be arranged in register with each other in an operative connecting condition wherein the plates span opposing surfaces of a pair of belt ends to be connected, each aperture being configured to permit a shank portion of a bolt to pass therethrough such that in the operative connecting condition, the shanks of the bolts pass through the aligned apertures of the first plate, belt ends and second plate, nuts which are screw threadedly received by the shanks projecting through the second plates serving to urge the first and second plates into the operative connecting or clamping condition wherein the belt ends are retained or clamped between said plates characterised in that the apertures in the first plate and a portion intermediate a bolt head and a threaded shank portion of the bolt are of generally angular configuration so as to prevent or inhibit rotation of the bolt in the aperture of the first plate in a receiving position wherein the bolt head is substantially in abutment with or in close proximity to an operative outer facing surface of the first plate, the intermediate portion furthermore being deformable so as to provide retaining formations for retaining and inhibiting longitudinal displacement of the bolt relative to the first plate in the receiving position.

The first plate may have detents, depressions or recesses surrounding the apertures to permit the bolt heads to be substantially flush with the operative outer facing surface of the first plate in the operative connecting condition.

The second plate may have detents, depressions or recesses surrounding the apertures to permit the nuts to be substantially flush with the operative outer facing surface of the second plate in the operative connecting condition.

The apertures and/or intermediate portions of the bolts are preferably of complementary square cross-section although it is to be appreciated that any suitable complementary interlocking configuration may be used.

The intermediate portions of the bolts may be configured to extend through or beyond an inner surface of the first plate.

The retaining formations may be provided by spurs or burrs towards the ends or edges, preferably at one or more corners or angular portions thereof, of the intermediate portion remote or away from a bolt head of the bolt.

The plates may include locking formations, preferably in the form of teeth, which are arranged to extend transversely the inner surfaces of the first and second plates and which in use engage the belt ends to aid retention of the belt ends between the plates in the connecting condition. The locking formations may be arranged along the edge regions or periphery of the plates.

According to another aspect of the invention there is provided a bolt having an intermediate portion between a bolt head and threaded shank portion of the bolt, the intermediate portion being dimensioned or configured to extend through or beyond an operative inner edge of an aperture in a plate through which it is receivable, the edges of the intermediate portion remote the bolt head being deformable to provide retaining formations for retaining and inhibiting longitudinal and rotational displacement of the bolt relative to the plate.

The retaining formations may in the form of spurs or burrs.

The intermediate portion may be of angular cross-section, preferably rectangular and in particular square, so as to inhibit rotation of the bolt in the apertures of the plate.

According to yet a further aspect of the invention there is provided a method of retaining a bolt in position in a plate so as to inhibit rotational and longitudinal displacement of the bolt relative to the plate which method includes forming retaining burrs or spurs at the ends of an intermediate portion as hereinbefore described remote the bolt head when in the receiving portion.

DETAILED DESCRIPTION OF THE INVENTION

The invention will now be described by way of a non-limiting example with reference to the accompanying drawings.

Figure 1:
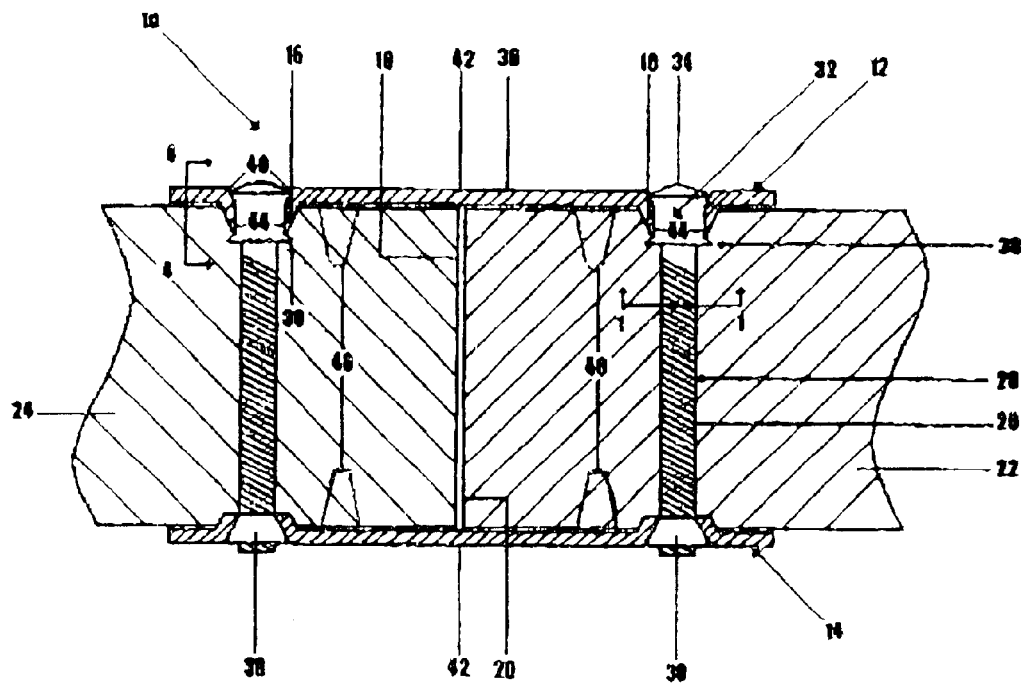
FIG. 1 is a sectioned side elevation of a belt fastener in accordance with the invention in an operative connecting condition.
Figure 2:
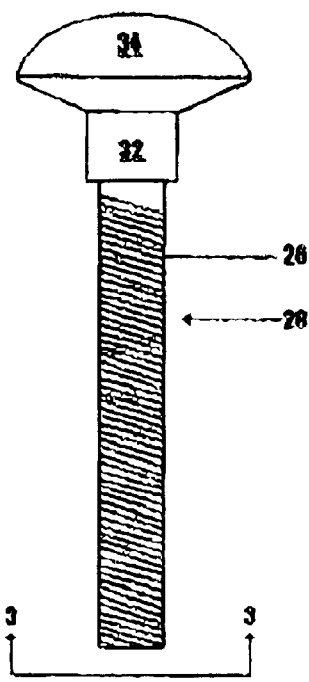
FIG. 2 is a side elevation of a bolt of the belt fastener.
Figure 3:
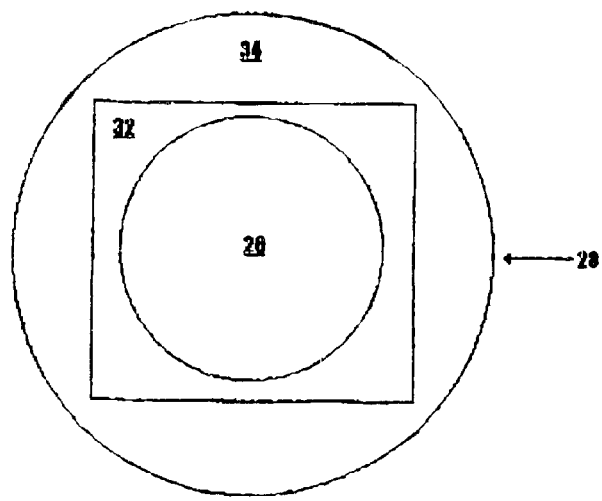
FIG. 3 is a plan view taken along lines 3—3 of the bolt of FIG. 2.
Figure 4:
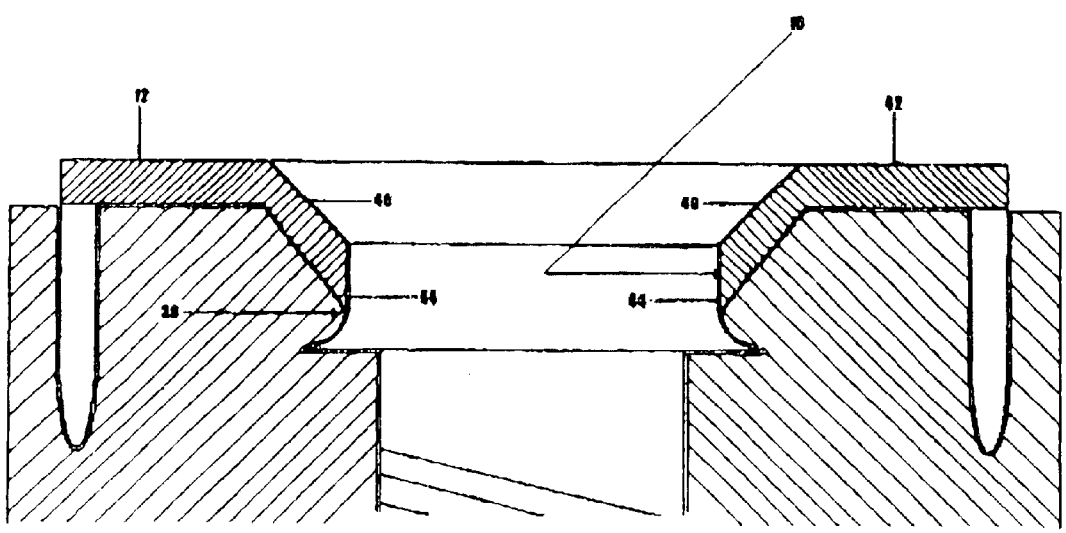
FIG. 4 is an enlarged view of a part of the belt fastener taken along lines 44 of FIG. 1.

Referring now to the drawings, reference numeral 10 generally depicts a belt fastener in accordance with the invention. The belt fastener includes a pair of operative first and second plates 12 and 14 having apertures 16 which are configured to be arranged in register with each other in an operative connecting condition (as shown in FIG. 1) wherein the plates 12 and 14 span opposing surfaces 18 and 20 of a pair of belt ends 22 and 24 to be connected.

The apertures 16 are configured to permit a shank portion 26 of a bolt 28 to pass therethrough such that in the connecting or clamping condition, the shanks 26 pass through the aligned apertures 16 of the first plate 12, belt ends 22 and 24 and second plate 14. Nuts 30 which are screw threadedly received by the shanks 26 projecting through the second plate 14 serve to urge the first and second plates 12 and 14 into the clamping condition.

Figure 5:
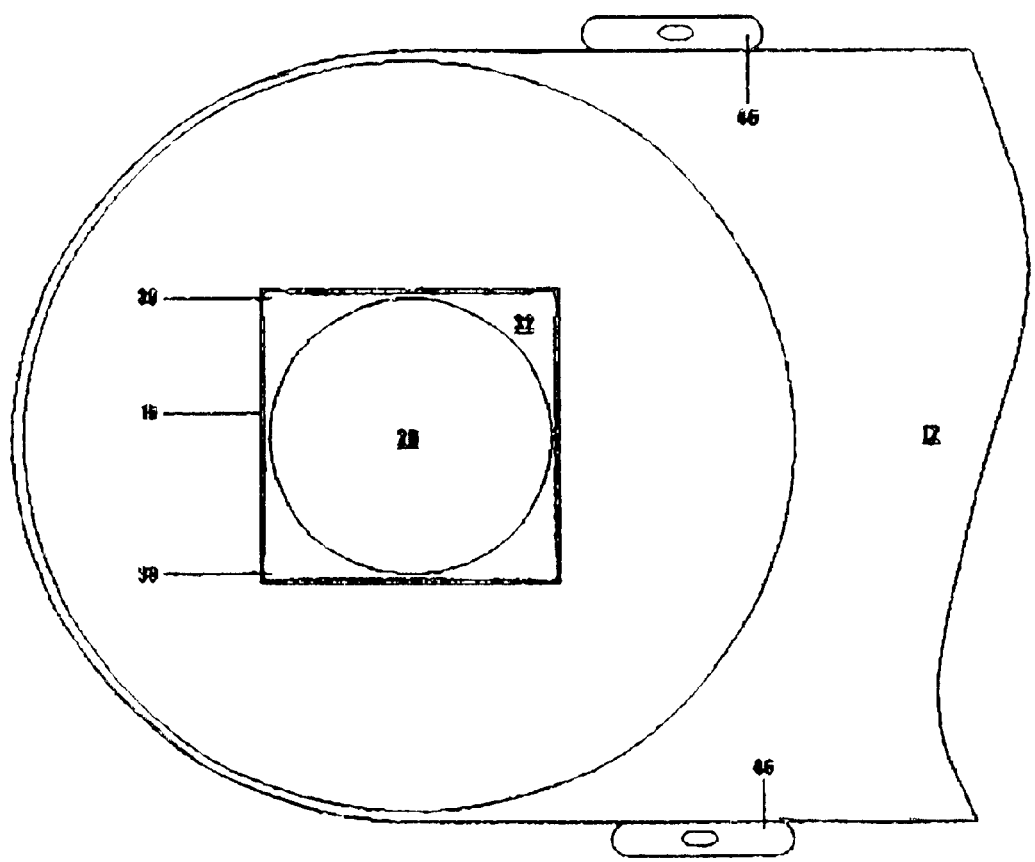
FIG. 5 is an enlarged view of a part of the belt fastener taken along lines 1—1 of FIG. 1.

An intermediate portion 32 is provided between a bolt head 34 and shank 26 of the bolt 28. The apertures 16 and intermediate portions 32 are of complementary square section as can be seen in FIG. 5 when viewed in plan thereby to prevent and inhibit rotation of the bolt 28 in the aperture 16 of the first plate 12 in a receiving position wherein the bolt head 34 is in abutment with an operative outer surface 36 of the first plate 12. The intermediate portion 32 is formed of a deformable material so as to provide retaining formations in the form of spurs or burrs 38 for retaining and inhibiting longitudinal displacement of the bolt 28 transversely the first plate 12. The intermediate portion 32 is configured or is of a length so as to extend through or beyond an inner surface 44 of the first plate 12 in a receiving position.

The first and second plates 12 and 14 have detents, depressions or recesses 40 surrounding the aperture 16 to permit the bolt heads 34 and nuts 30 to be substantially flush with the operative outer facing surfaces 42, 36 of the second and first plates 14 and 12 in the operative connecting conditions.

Locking formations in the form of teeth 46 arranged to extend transversely edge regions of the first and second plates 12 and 14 and which in use engage the belt ends to aid retention of the belts between the plates 12 and 14 in the connecting condition.

The Applicant believes that a belt fastener in accordance with the invention provides a cost-effective and simplified alternative to conventional belt fasteners as described in the prior art.

It is to be appreciated, that the invention is not limited limited to the precise constructional details as hereinbefore described and as illustrated with reference and/or to the accompanying drawings.

What is claimed is:

1. A belt fastener for fastening together a pair of belt ends including:

operative fist and second plates having apertures which are configured to be arranged in register with each other in an operative connecting condition wherein the plates span opposing surfaces of a pair of belt ends to be connected, each aperture being configured to permit a shank portion of a bolt to pass there through such that in the operative connecting condition, the shanks of the bolts pass through the aligned apertures of the first plate, belt ends and second plate, nuts which are screw threadedly received by the shanks projecting through the second plate serving to urge the first and second plates into the operative connecting or clamping condition wherein the belt ends are retained or clamped between said plates characterized in that the apertures in the first plate and a portion intermediate a bolt head and a treaded shank portion of the bolt are of generally angular complementary configuration so as to prevent or inhibit rotation of the bolt in the aperture of the first plate in a receiving position wherein the bolt head is substantially in abutment with or in close proximity to an operative outer facing surface of the first plate, the intermediate portion furthermore being deformable so as to provide retaining formations for retaining and inhibiting longitudinal displacement of the bolt relative to the first plate in the receiving position.

2. A belt fastener as claimed in claim 1 wherein the first plate has detents, depressions or recesses surrounding the apertures to permit the bolt heads to be substantially flush with the operative outer facing surface of the first plate in the operative connecting condition.

3. A belt fastener as claimed in claim 1 wherein the second plate has detents, depressions or recesses surrounding the apertures to permit the nuts to be substantially flush with the operative outer facing surface of the second plate in the operative connecting condition.

4. A belt fastener as claimed in claim 1 wherein the apertures and intermediate portions of the bolts are of complementary cross-section, the cross-section being selected from the group including: square, rectangular, hexagonal and triangular.

5. A belt fastener as claimed in claim 4 wherein the intermediate portion of the bolt is configured to extend through or beyond an inner surface of the first plate.

6. A belt fastener as claimed in claim 1 wherein the retaining formations are provided by spurs of burrs towards an end or edges, at at least one corner or angular portion thereof, of the intermediate portion remote or away from a bolt head of the bolt.

7. A belt fastener as claimed in claim 1 wherein the plates include locking formations, such as teeth, which are arranged to extend transversely the inner surfaces of the first and second plates and which in use engage the belt ends to aid retention of the belt ends between the plates in the connecting condition.

8. A belt fastener as claimed in claim 7 wherein the locking formations are arranged along the edge regions or periphery of the first and second plates.

* * * * *